United States Patent
Gentil et al.

(10) Patent No.: US 8,205,072 B1
(45) Date of Patent: Jun. 19, 2012

(54) METHOD AND APPARATUS FOR ELECTRONICALLY CONFIGURING A SECURED USER DESKTOP

(75) Inventors: Gregoire Alexandre Gentil, Paris (FR); Alireza Malekzadeh, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 1500 days.

(21) Appl. No.: 10/898,413

(22) Filed: Jul. 22, 2004

Related U.S. Application Data

(60) Provisional application No. 60/489,358, filed on Jul. 22, 2003.

(51) Int. Cl.
*H04L 29/06* (2006.01)
(52) U.S. Cl. .................................. 713/153; 713/150
(58) Field of Classification Search .................. 713/153, 713/189, 150, 152, 164; 709/225, 226, 229, 709/238; 705/79
See application file for complete search history.

(56) References Cited

U.S. PATENT DOCUMENTS

| | | | |
|---|---|---|---|
| 5,696,928 A | | 12/1997 | Grewe et al. |
| 6,385,677 B1 | | 5/2002 | Yao |
| 6,546,460 B1 | | 4/2003 | Iida et al. |
| 6,567,273 B1 | | 5/2003 | Liu et al. |
| 6,836,888 B1 * | | 12/2004 | Basu et al. .................... 718/104 |
| 7,069,275 B2 * | | 6/2006 | Salmen .................................. 1/1 |
| 2002/0065776 A1 * | 5/2002 | Calder et al. .................... 705/51 |
| 2002/0078297 A1 | 6/2002 | Toyama et al. |
| 2002/0099957 A1 * | 7/2002 | Kramer et al. ................. 713/201 |
| 2002/0166053 A1 * | 11/2002 | Wilson .......................... 713/189 |
| 2003/0105772 A1 * | 6/2003 | Sexton et al. ............. 707/103 R |
| 2003/0167376 A1 | 9/2003 | Koh |
| 2003/0191799 A1 | 10/2003 | Araujo et al. |
| 2005/0015491 A1 * | 1/2005 | Koeppel ........................ 709/226 |

OTHER PUBLICATIONS

O'Donell, Jim, "Digital Leakage Dogs Remote Access," e-Promag.com Aug. 20, 2003, 3 pages.
Rapoza, Jim, "Twingo Secures Systems," eWeek, Jul. 28, 2003, retrieved on May 12, 2004 from <http://eweek.com/article2/0,3959,1204975,00.asp>, 2 pages.

* cited by examiner

*Primary Examiner* — Kim Vu
*Assistant Examiner* — Suman Debnath
(74) *Attorney, Agent, or Firm* — Hickman Palermo Truong Becker Bingham Wong LLP

(57) ABSTRACT

A method of providing endpoint security for a session on an untrusted computer accessing data on a networked server is disclosed. A virtual secure desktop is created on the untrusted computer that protects the user's applications running in the virtual secure desktop from malicious code and encrypts all data. Data to be written to the hard drive is stored in a secure vault. The secure vault is completely encrypted and erased at the end of the virtual secure desktop session. The virtual secure desktop may be created by creating a separate user session on the untrusted computer and linking the separate user session to the secure vault. Alternatively, the virtual secure desktop may be created by intercepting calls the Native API and redirecting requests from the virtual secure desktop session to the secure vault.

29 Claims, 14 Drawing Sheets

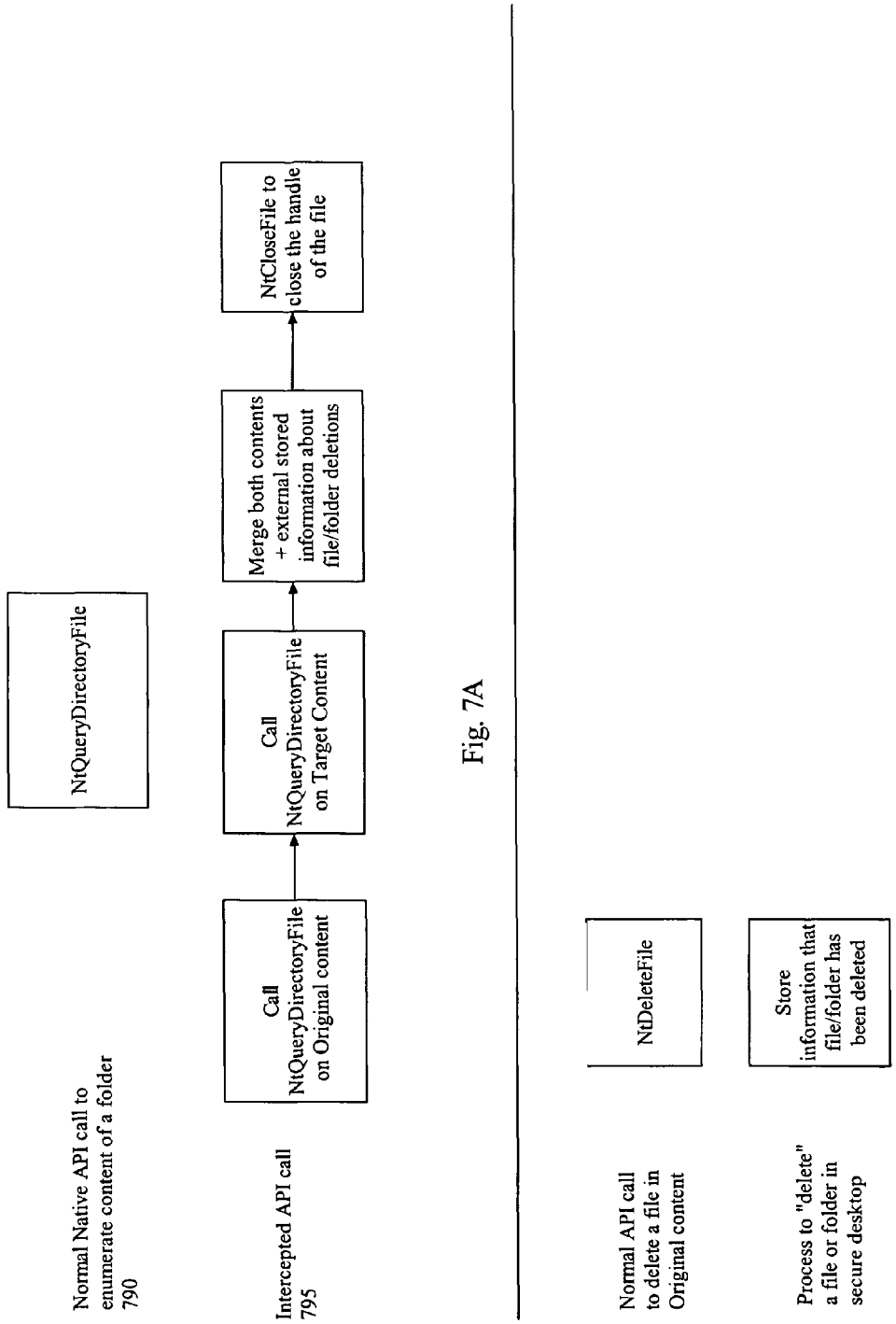

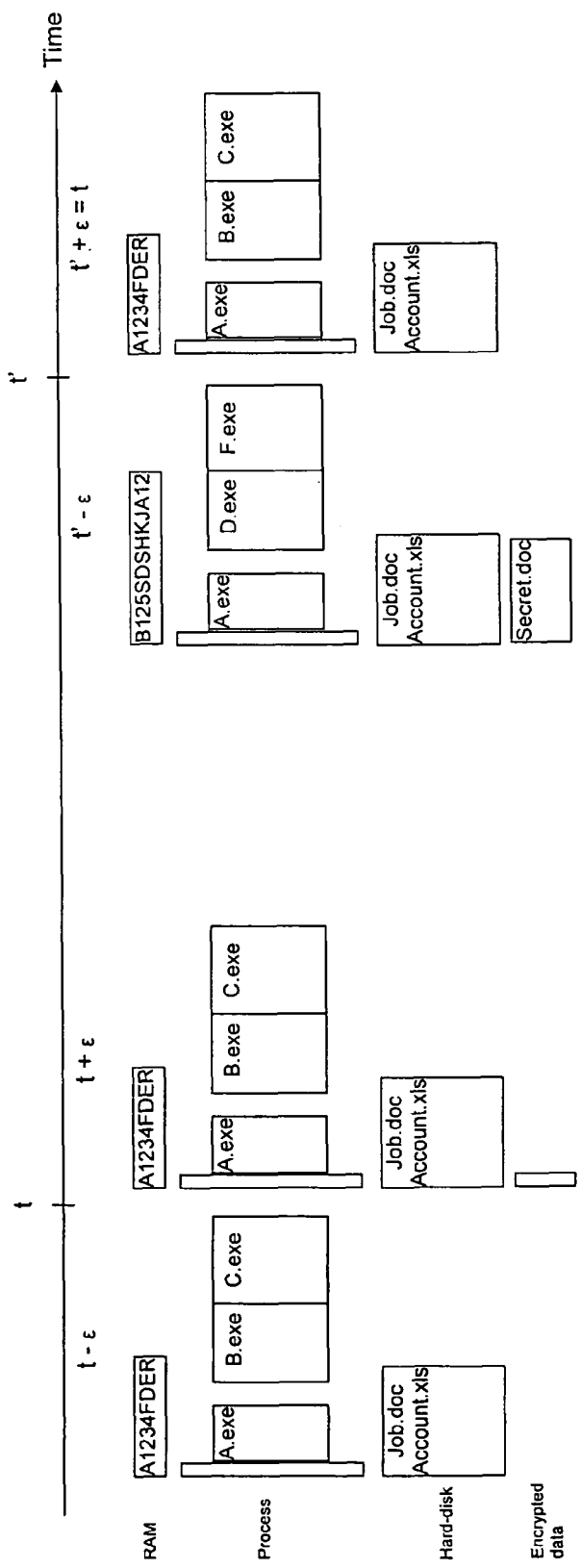

METHOD AND APPARATUS FOR ELECTRONICALLY CONFIGURING A SECURED USER DESKTOP

CROSS-REFERENCE TO RELATED APPLICATIONS

Priority Claim

This application claims domestic priority under 35 U.S.C. §119(e) to prior provisional application Ser. No. 60/489,358, filed Jul. 22, 2003, "Method and Apparatus for Electronically Configuring a Secured User Desktop," of Gregoire Gentil et al., the entire contents of which are hereby incorporated by reference as if fully set forth herein.

FIELD OF THE INVENTION

The present invention generally relates to secure access of networked applications and data from an untrusted computer. The invention relates more specifically to creating a virtual secure desktop session on any computer that allows a user to access applications and information from a networked server without leaving any data on the computer after the virtual secure desktop session is concluded.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer access has become very commonplace. With the widespread use of Microsoft operating systems and applications, computers have become more of a commodity as just about any computer could be used to read email or edit a Microsoft Word document.

In addition, computers in a wide variety of locations can be used to access networked applications or the Internet. The ability to access applications and information from any location becomes more important users become more mobile. Users increasingly need to be able to check email and access important documents anywhere at any time. However, increased computer and Internet access have caused many security issues.

Typical users, especially people who use computers for business purposes, have a main computer. For a typical business user, the main computer may be provided through the user's employer corporation and set up for the user by the corporation's information technology (IT) department, for example. The set up of a user's main computer by IT typically includes installation of various security measures. These security measures protect information on the user's main computer and on the corporation's server that is accessed by the user through his main computer. This main computer can be considered to be a "trusted" computer, as its configuration is controlled by the corporation's IT department and is known to be secure.

However these users frequently require access to applications and information on the corporate server from a computer other than their main computer, such as a home personal computer, a friend's computer, or a public access computer at a library, public kiosk, business center, or airline lounge, for example. These computers are not secured in the same way that the main computer is. As discussed above, a user's main computer may be setup and managed by the IT department of the user's employer company to protect corporate information that will be accessed from the user's main computer. In addition, the user may configure his main computer to protect personal information using a number of known products and configurations.

In order to able to access applications and data during a session in which a user accesses a server from such a third party or "untrusted" computer, it would be desirable to be able to protect the confidentiality of the user and any information downloaded to the untrusted computer.

The advent of such technologies as Firewalls, DMZs (Demilitarized Zone—a computer host or small network inserted as a "neutral zone" between a company's private network and the outside public network), SSL (Secure Socket Layer) and VPN (Virtual Private Network) have allowed for reliable authentication and secure communications when the user accesses applications and information on a server through a web browser operating on almost any kind of computer. While known computer systems are capable of providing a secure communication process to access networked applications and information, these methods do nothing to protect what is being done on an untrusted third party computer. A method of providing this "last mile" of security is needed.

As an example scenario, consider the business traveler who uses a hotel business center to make last-minute revisions to a document. He logs on to his company's SSL VPN, authenticates and then finds and downloads the document. He edits the document using a word processing application and then e-mails the updated document to the home office. As shown in FIG. 1A, the authentication process 203, Firewall or DMZ 102 and SSL VPN connection 200 from the untrusted computer in the hotel's business center 201 to the corporate server 101 provide secure communications. However, these security measures do not address security on the untrusted computer 201. As discussed in detail below, malicious code 204, data spies 205 and data leakage 206 onto the untrusted computer 201 present a major source of security threat.

Accessing one's data on a server from an untrusted computer, such as an airport kiosk or public terminal, raises serious security issues. In particular, some confidential data typically remains on the computer or machine used to access an application or information through a server. In the example above, the business traveler using the hotel business center computer 201 may leave footprints of his activities on that computer through "data leakage" 206. For example, the browser he used stores the URLs he visited, and possibly any passwords used to access a site. Access to corporate Webmail may leave temporary files created when email attachments are downloaded and viewed. The browser and the application used to make revisions to the document may have saved a copy of the document in a temp directory. Malicious code resident on the untrusted computer could gather information from the user's use of the untrusted computer, such as what the user does in the browser, temporarily stored passwords and server addresses, and send it to a malicious person. Without realizing it, the business traveler has compromised the security of his company.

In the case of data leakage, even if the user manually deletes files after his networking session, data on a hard drive or other storage device can be easily recovered by another user. Usually, deleting a file only deletes the entry in the folder structure, not the data itself from the hard drive. Even if the data is erased, it is typically still accessible as it remains on the hard drive in a recoverable format. For example, data can be easily recovered through the Recycle Bin or through shareware applications if the Recycle Bin has been emptied. Many other methods are known to those skilled in the art.

This problem is especially critical when a user accesses applications and information on a public computer, such as a library computer or airport kiosk. Any data left on the computer at the conclusion of the user's session on that computer can be accessed by a great number of other users.

Traces of information left on an untrusted computer are a security issue for any user who accesses a networked server, not just business users. A user could use a public computer to access a website for personal use. Personal and private information, including credit card, social security numbers or other personal information, could be left on the public computer. Although the invention is described herein using the example of a user accessing a corporate server, it is applicable to any user accessing the Internet for any reason from an untrusted computer.

As a security measure, some Webmail server providers include features that automatically delete the user data at the end of the Webmail session. However, such known methods do not always work. For instance, the methods may require some privileges the user doesn't have on the untrusted computer. Furthermore, some files could be in use by another process, and therefore cannot be deleted. These known methods are after-the-fact approaches to the problem and consist of catching up with the user data to find out what the user has done. A different or new version of a browser could change the location of data, and render it impossible to determine what the user did in his session.

Even when these known methods do successfully delete user files, the data is not really wiped out and can still be recovered. The user is never completely sure that everything that was intentionally or unintentionally created has been erased.

Even non-publicly available computers, such as home computers, can represent a threat to data security. When important corporate data is accessed over a network on a home computer, some data will typically remain on the computer's hard drive. This data could be at risk for a number of reasons. For example, the user could leave the corporation, wherein traces of important corporate data could potentially be left on the user's home computer. The user could upgrade his home computer or send it in for repairs, thereby allowing persons outside the corporation access to data on the home computer, potentially including important confidential corporate information. In addition, many people simply discard their hard drives when they upgrade their home computer. In the vast majority of cases, those drives are not sanitized and may be discarded with valuable corporate information that can easily be recovered.

Thus, a solution securing the "last mile" of security when a user accesses applications and information over a network from an untrusted computer is needed. The method and system of the present invention provides end-point security by preventing any data leakage onto the untrusted computer. In addition the method and system of the present invention protect against security threats from malicious code that may reside on the untrusted computer.

In addition, when working on a computer other than their main computer, users do not have access to all their usual settings. For example, a pubic computer does not have the user's favorite or most used websites saved in the browser's "favorites" list. Users have to learn and adapt to many different work environments as they use different computers. This has an impact on productivity, even though the use may be short-lived and temporary.

A method of allowing users to customize any third party computer to use the user's preferred settings is also needed.

The present invention is illustrated by way of example, and not by way of limitation, in the figures of the accompanying drawings and in which like reference numerals refer to similar elements and in which.

Figure 5A:
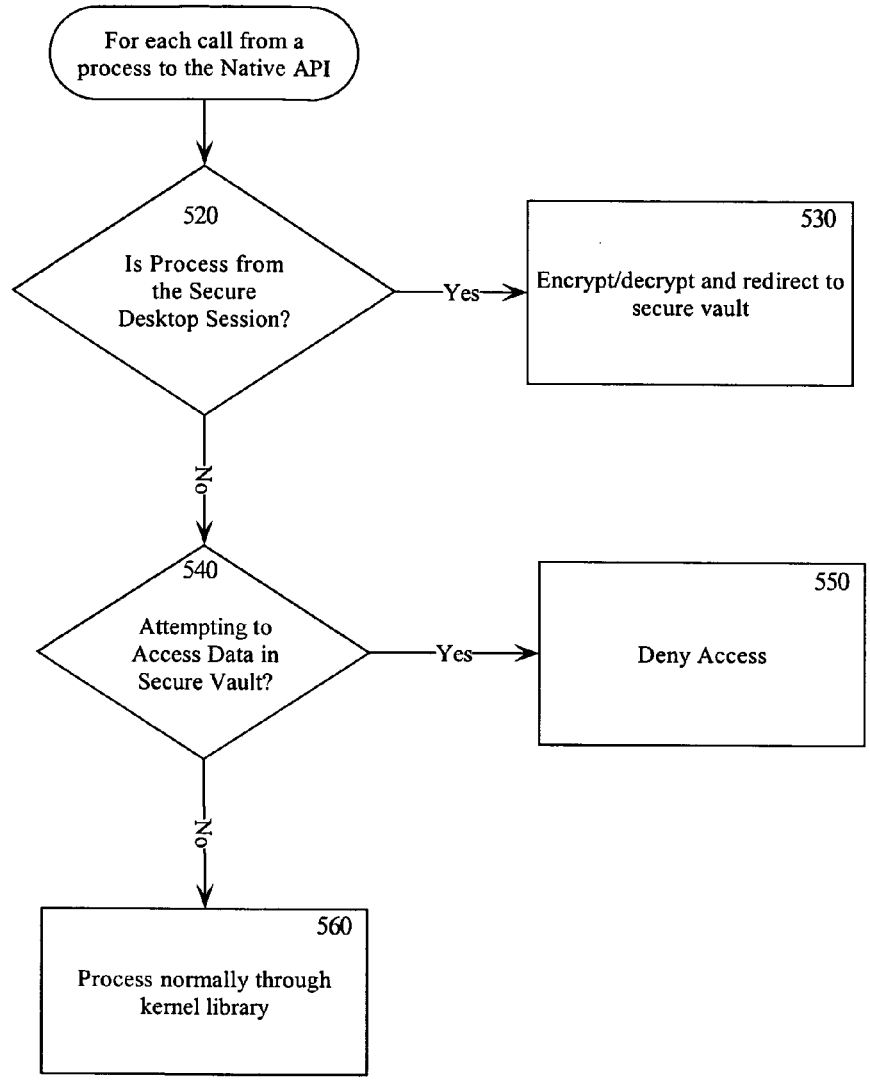
FIG. 5A is a flow diagram of a second approach for creating a virtual secure desktop session.
Figure 5B:
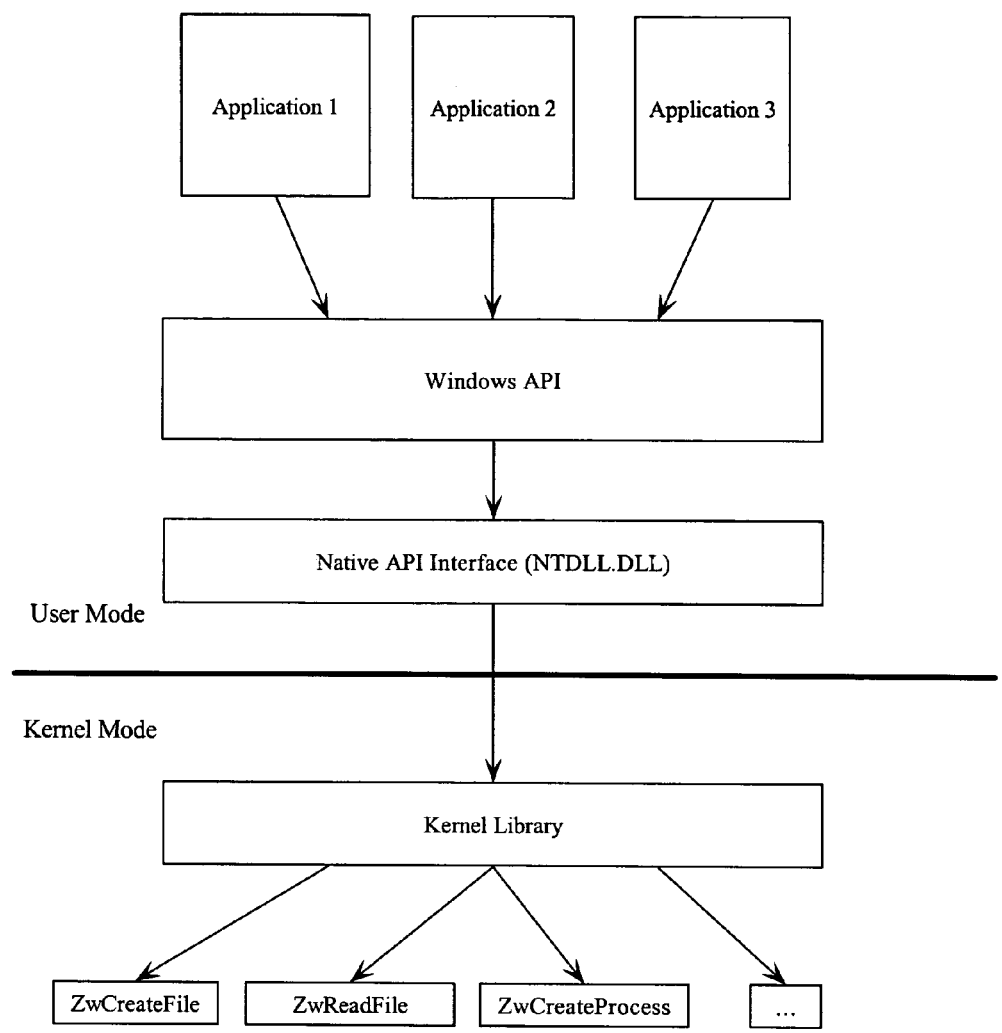
Figure 5C:
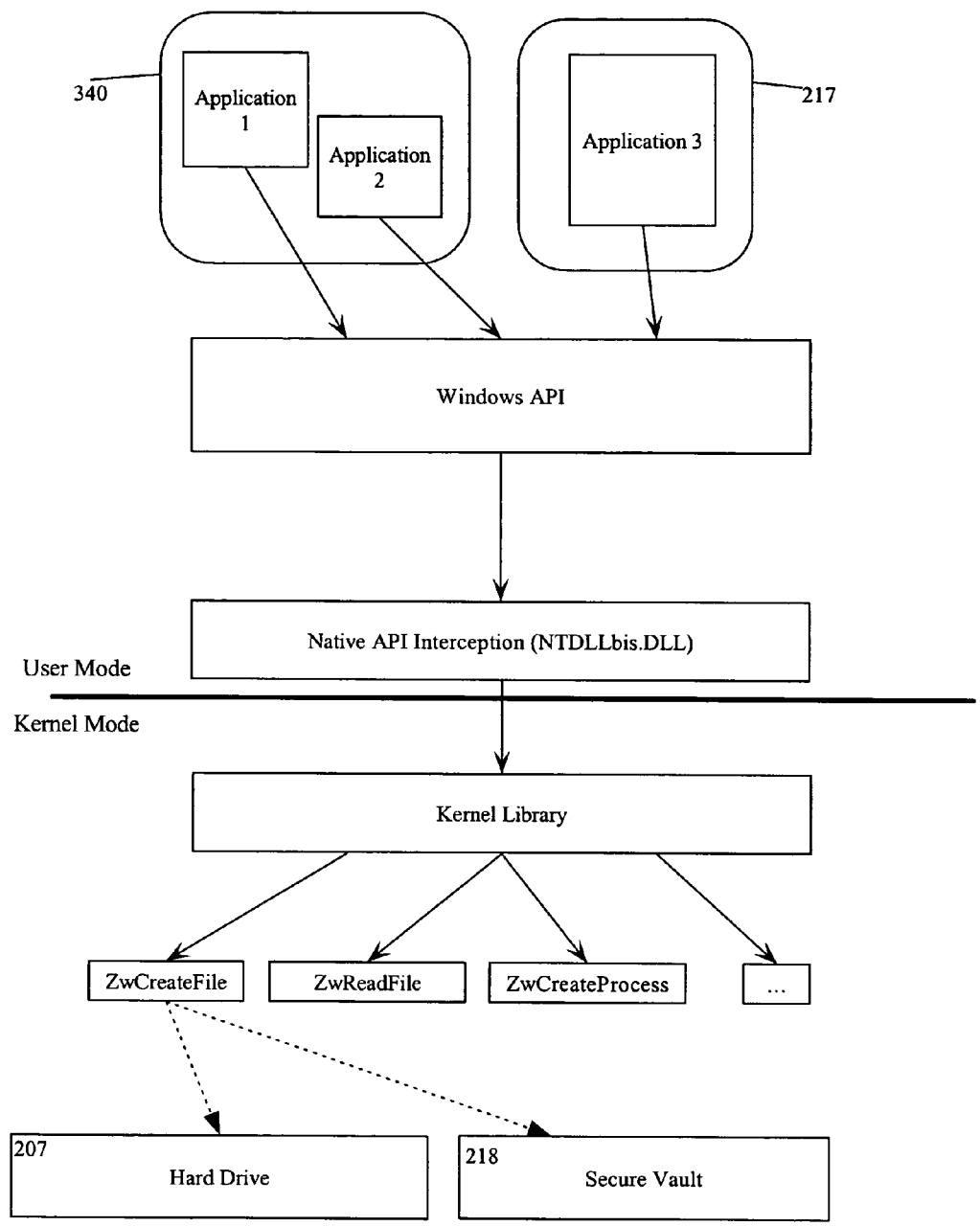
Figure 6:
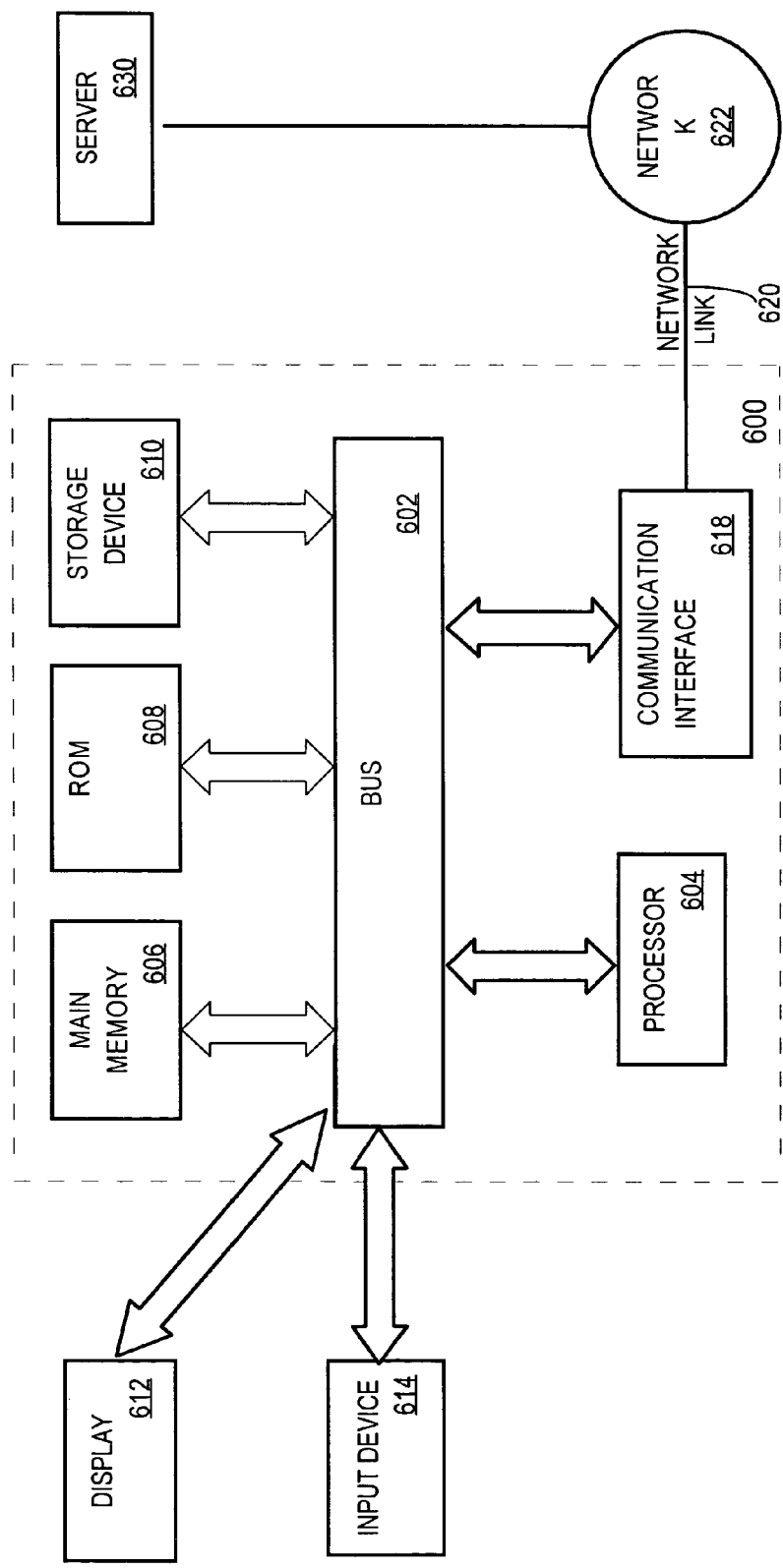
Figure 7B:
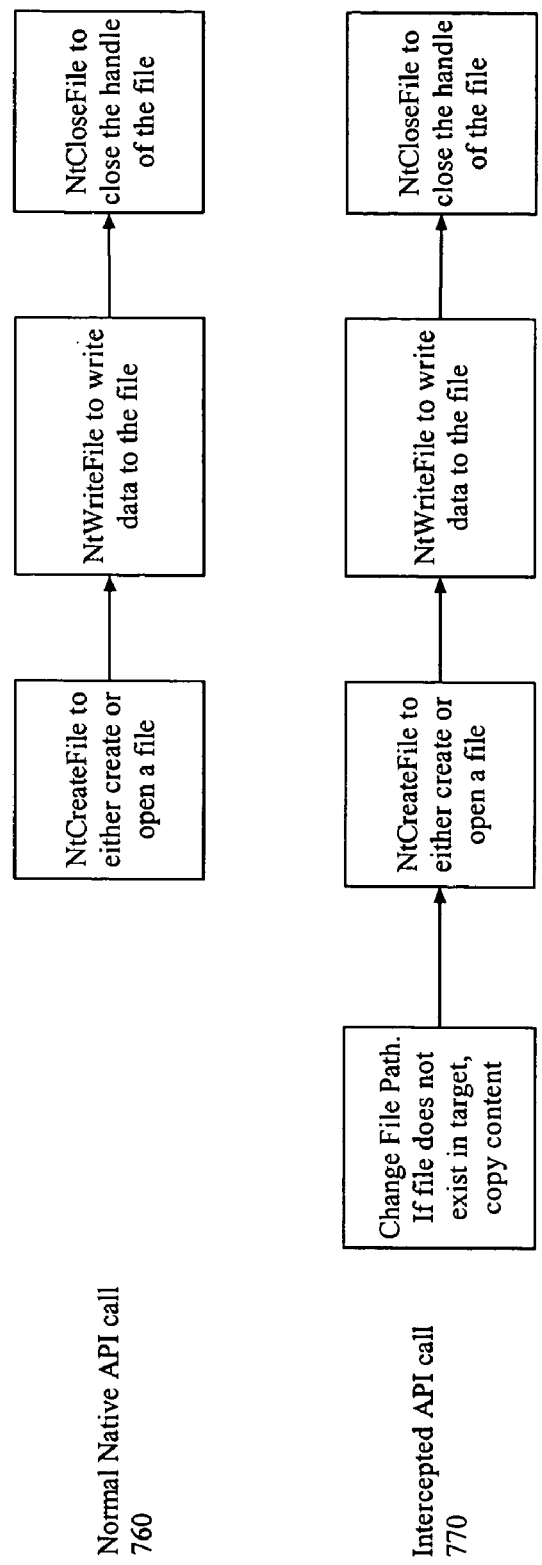
Figure 7C:
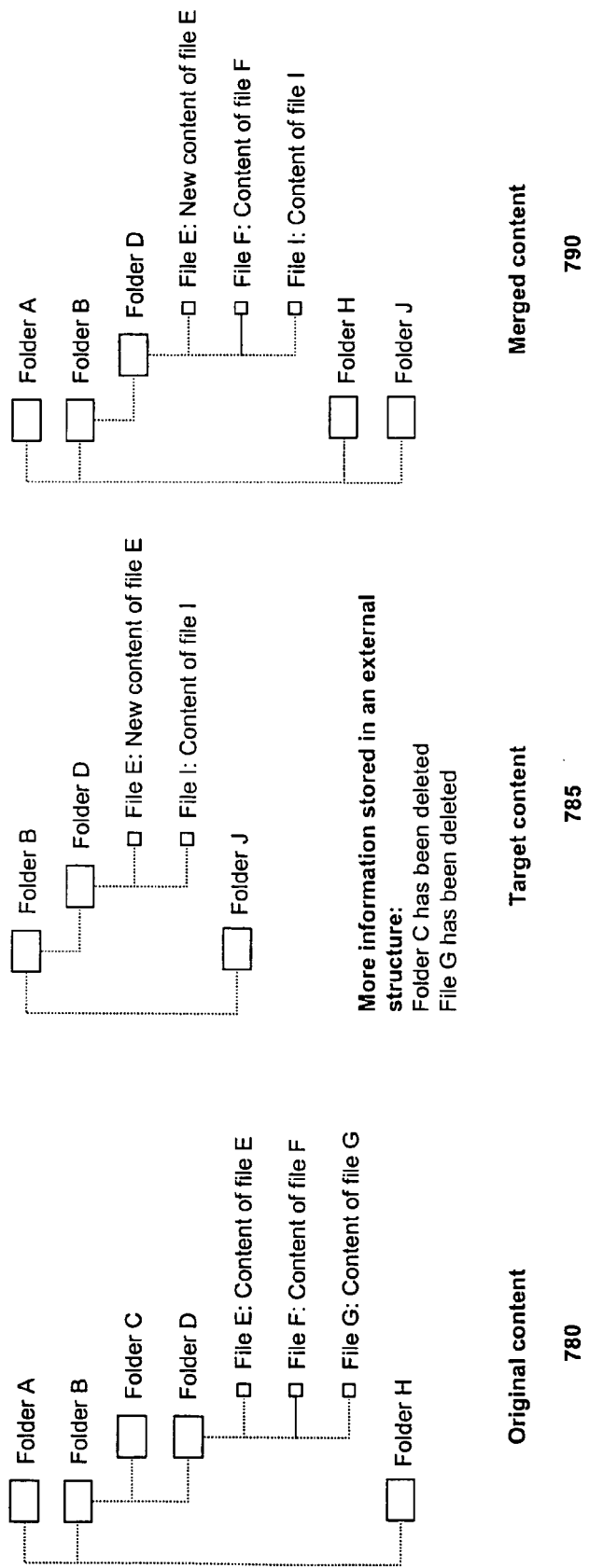
Figure 8:
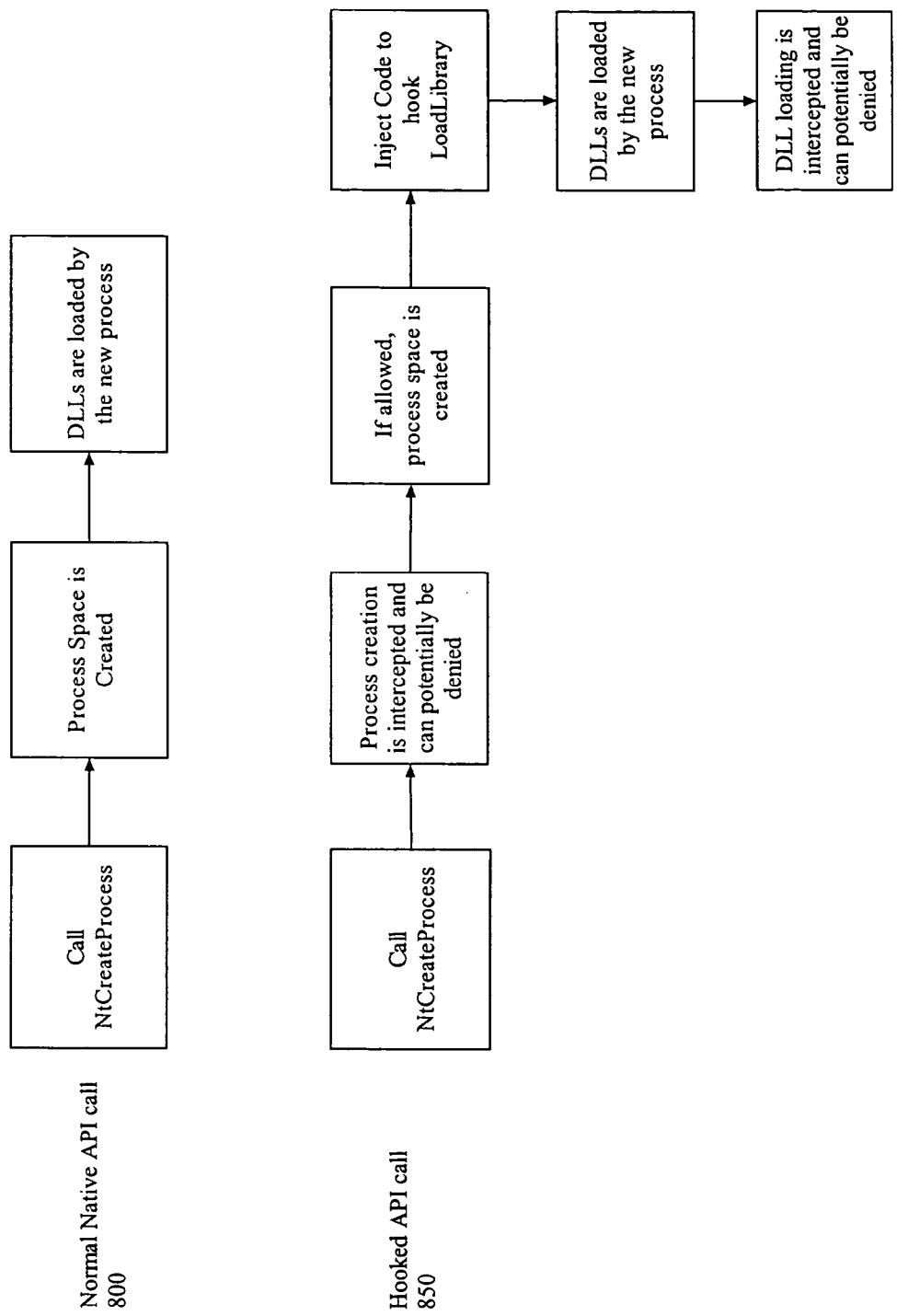

FIG. 5B a block diagram that illustrates how processes use the native API of the operating system to access the hard drive;

FIG. 5C is a block diagram that illustrates how the native API should be intercepted to control access to the hard drive;

FIG. 6 is a block diagram that illustrates a computer system upon which an embodiment may be implemented;

FIG. 7A illustrates the enumeration of folder content process in the virtual secure desktop;

FIG. 7B compares the normal Native API calls made to create a file in the default session and the intercepted native API calls made to create a file in the secure vault;

FIG. 7C illustrates how target content is separated from the original content and merged for display to the user in the virtual secure desktop session;

FIG. 7D illustrates how a file is deleted in the virtual secure desktop;

FIG. 8 illustrates an embodiment of the CreateProcess hooking process; and

FIG. 9 illustrates an undoable PC extension to the invention.

DETAILED DESCRIPTION

A method and apparatus for creating and using a virtual secure desktop is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:
  1.0 Overview
  2.0 Using a Virtual Secure Desktop
  3.0 Creating a Secure Vault
  4.0 Creating the Virtual Secure Desktop Session
    4.1 A Multi-Session Environment Approach for Creating a Virtual Secure Desktop
    4.2 Intercepting the Operating System API to Create a Virtual Secure Desktop
  5.0 Implementation Mechanisms—Hardware Overview
  6.0 Extensions and Alternatives

1.0 Overview

As an introduction only, and without limiting the scope of the appended claims, the needs identified in the foregoing Background, and other needs and objects that will become apparent for the following description, are achieved in the present invention, which comprises, in one aspect, a method of creating an encrypted, secure virtual desktop on an untrusted computer.

The virtual secure desktop of the present invention is intended to increase the security of third-party untrusted computers. In particular, the virtual secure desktop prevents unintentional data leakage as well as information theft through malicious code. According to one feature of this aspect, one method of the present invention involves providing endpoint security for a user of an untrusted computer accessing a networked server through a secure communications session such that no data is left on a hard drive of the untrusted computer after the secure communication session, said user using a default Microsoft Windows session on the untrusted computer. The method comprises creating a new user on the untrusted computer; loading the new user to create a separate user session; creating a separate file system for the separate user session; and causing all attempts to access the default file system by a process linked with the separate user session to be encrypted and redirected to the separate file system.

In another aspect, a method of creating a secure desktop session comprises the steps of intercepting all requests for functions that access the computer's file system from all processes, including processes linked with a default session of the computer and processes linked with the secure desktop session. The method determines whether a request is from a process linked with the secure desktop session; and if the request is from a process linked with the secure desktop session, modifies the request to send the request to a predetermined separate location and encrypt all data written to the predetermined separate location. If the request is not from a process linked with the secure desktop session, the method denies the request if the request is attempting to access a file in the predetermined separate location, otherwise passes the request to the protected mode function unmodified.

In other aspects, the invention encompasses a computer apparatus and a computer-readable medium configured to carry out the foregoing methods. Further, many other features and aspects will become apparent from the following description and from the appended claims.

2.0 Using a Virtual Secure Desktop

Typically, a user must log in to a computer and use a Windows session in order to access the hardware and software resources of the computer. Rather than using the default or then-current Windows session, the inventive method creates a new session for the temporary use of the user on the untrusted third party computer. This temporary session is completely secure and customizable.

Running side by side with the default Windows session of the computer, the virtual secure desktop is able to access all the local hardware resources such as the CD-ROM drive, the printer, the network connection, etc. Furthermore, from within the virtual secure desktop session, the user will have access to software applications installed on the third party computer.

The virtual secure desktop of the present invention is preferably initiated by downloading an application. In one embodiment, the method of the present invention can be delivered as a plug-in application from Web mail or other Web application accessed by a user from an untrusted computer, such as a public kiosk.

For example, a user on an untrusted computer may connect to a particular URL on the Internet. The user connects to this URL using the standard resources available on the untrusted computer, such as a web browser. The user does this during a normal session on the untrusted computer, which will be called the "default session."

The server pushes an application to the untrusted computer after the user connects to the URL in the default session. Alternatively, the user may access Webmail during the default session, and Webmail will push the application to the untrusted computer. Alternatively, the application may be "pulled" by the user onto the untrusted computer. Many methods of downloading the application to the untrusted computer are apparent to those skilled in the art.

This application may be a plug-in, such as an ActiveX application or Java Applet, or it may be an executable program, such as a Window executable program, or a combination of those mentioned plug-ins, or any other type of application known to those skilled in the art. The application is preferably relatively small in byte size. Downloading the application may cause the untrusted computer to automatically execute the application, whereupon a window appears in the user's default session indicating that the virtual secure desktop is being created. Preferably, the application is started without rebooting the untrusted computer.

Figure 1A:
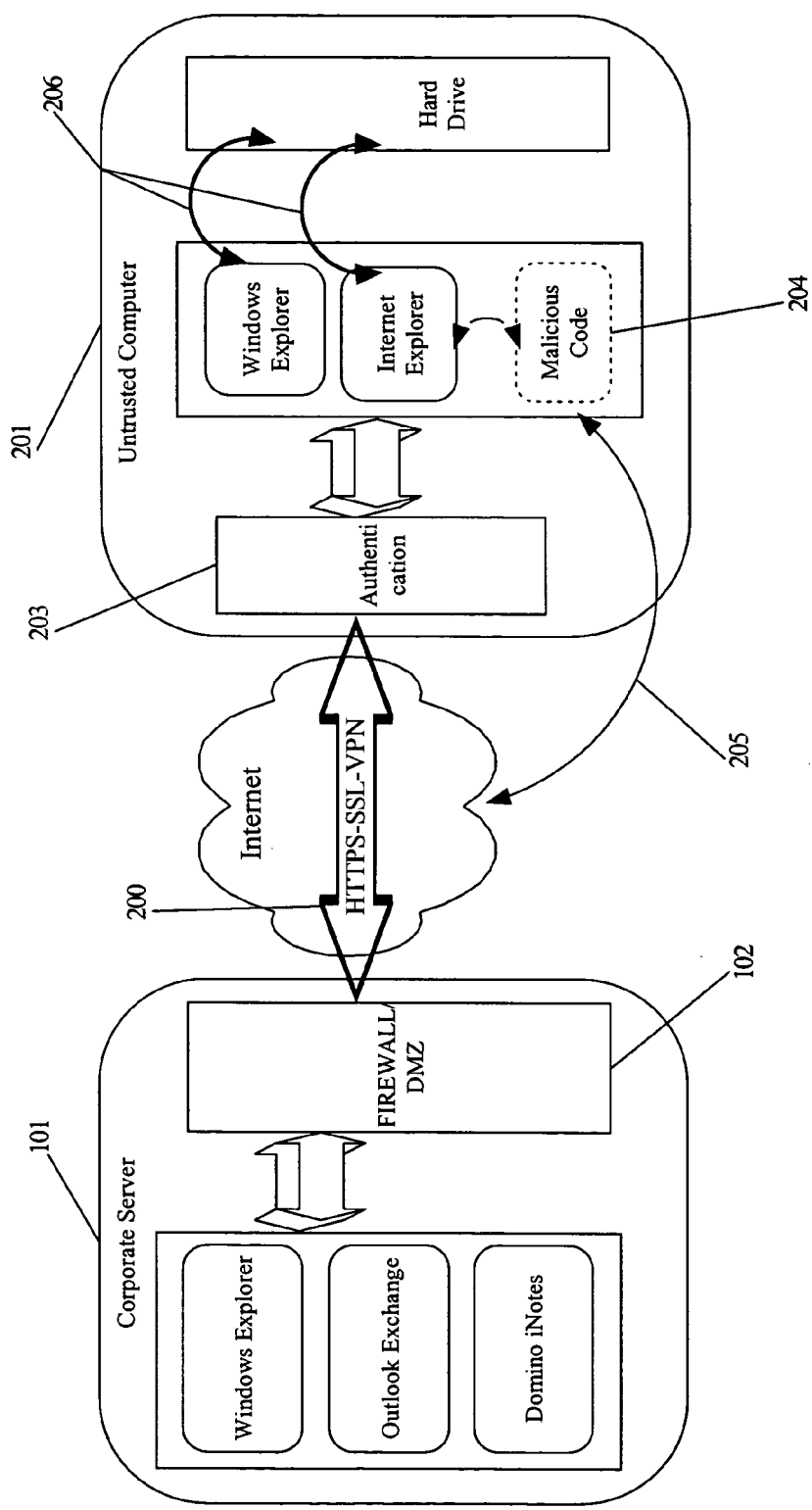
FIG. 1A is a drawing illustrating typical security measures taken when a user accesses a corporate server from a third-party computer.
Figure 1B:
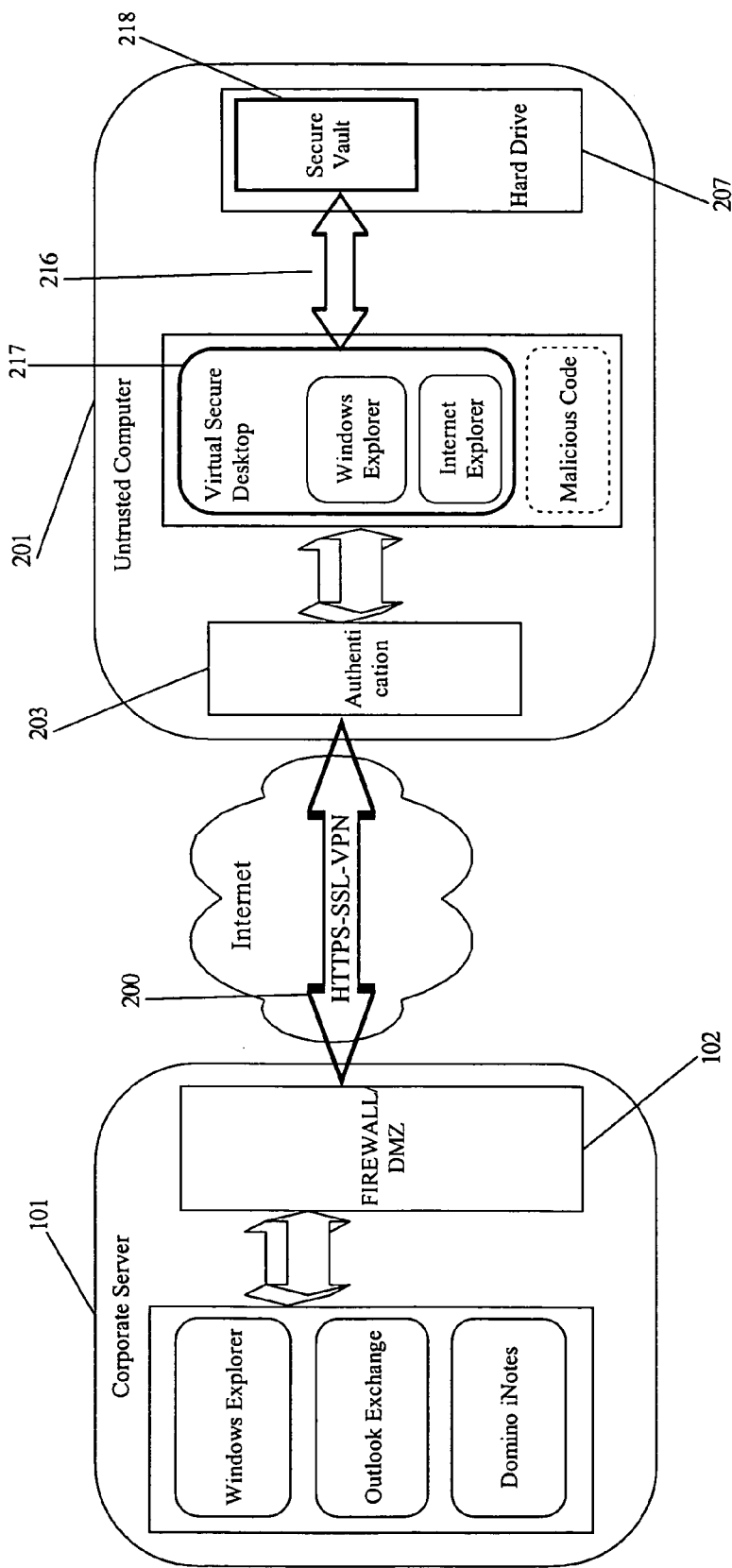
FIG. 1B is a drawing illustrating a high-level overview of the additional endpoint security provided by the virtual secure desktop of the present invention.

FIG. 1B illustrates that the secure desktop session 217 is isolated on the untrusted computer 201. As is described in more detail herein, the secure desktop 217 only writes to an encrypted secure vault 218, and never directly to any part of the hard drive 207 of the untrusted computer that has not been incorporated into the secure vault 218.

The downloaded application creates a window that is preferably identified by an icon indicating that the window is a virtual secure desktop session. The virtual secure desktop window may also be of a different background than the default session, further indicating to the user that it is a virtual secure desktop session. The virtual secure desktop session is linked to a "secure vault", described in more detail herein. A password is created for the secure vault. The password is kept in memory as long as needed. The password is never written to the hard drive or displayed.

Figure 2:
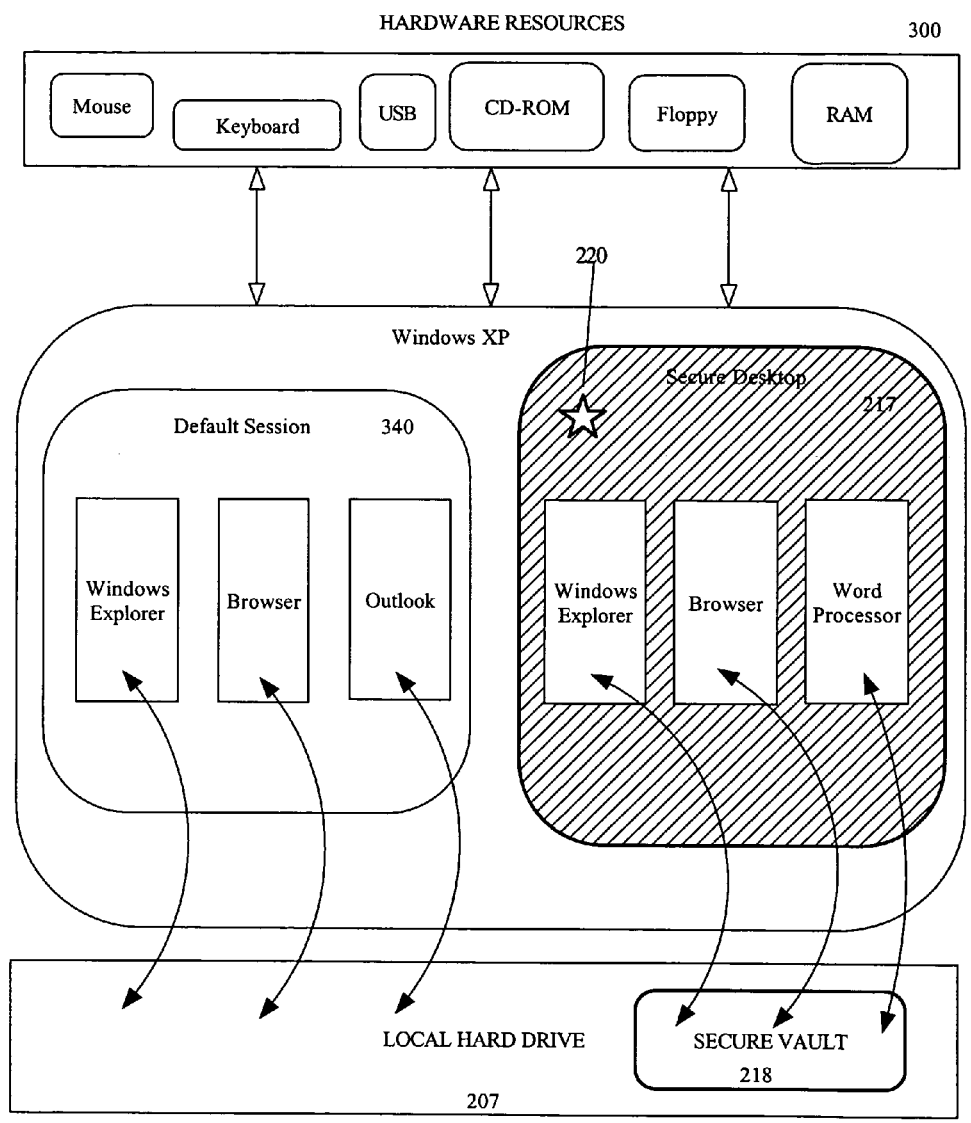
FIG. 2 illustrates how the virtual secure desktop session operates side-by-side with the default session on an untrusted computer.

FIG. 2 illustrates that the virtual secure desktop session 217 is a separate session within the Windows XP environment. As is known to those skilled in the art, it is not required that a Windows XP operating system be used. There are many different operating systems that could be used to create the virtual secure desktop of the present invention. Both the virtual secure desktop session 217 and the default session 340 have access to the hardware resources 300 of the untrusted computer, such as the printer, floppy drive, keyboard, mouse, etc. In addition, the virtual secure desktop session 217 has access to all of the software applications that may have been installed on the untrusted computer, just like the default session 340.

These sessions operate in a "side-by-side" manner, and the user can switch between them if desired. For example, each session may be contained within a Desktop, wherein each Desktop contains an icon that allows the user to switch to the other session upon clicking the icon. The icon in the virtual secure desktop window (220 in FIG. 2) also lets the user to know that he is working within the virtual secure desktop session. As shown, virtual secure desktop session 217 may also have a different background so that the user quickly knows which session he is working in.

The virtual secure desktop is a complete Windows session from the user's perspective. The session is customizable, and in one embodiment, settings saved from a user's main computer may be imported to customize the virtual secure desktop session automatically. The virtual secure desktop session will then use those settings and very closely resemble the user's main computer environment. In another embodiment, templates created for all corporate users may be imported to create a standard custom environment. All customization performed within the virtual secure desktop session will be limited to that environment and have no impact on the default session.

Any processing done during the secure desktop session is encapsulated in that session and is not apparent to default session. For example, the "Auto Complete" and "Password Remember" browser features are specific to each Desktop. As is known to those skilled in the art, the "Auto Complete" feature keeps track of information that a user has recently typed, such as Web site addresses, information in forms, and search queries, and the "Password Remember" feature stores a password as entered by a user.

In the present invention, these features are specific to each desktop and the settings of each desktop are kept separately. That is, for example, if the user switches to the default session from the virtual secure desktop session and uses the browser in the default session, the browser in the default session will not auto complete to sites that were visited from the browser in the virtual secure desktop and will not remember any passwords entered in the virtual secure desktop.

As another example of how the virtual secure desktop session is separate from the default session, consider a user using a word processing application while in the virtual secure desktop session. The user saves a document in the file system. When the user switches to the default session, the file created during the virtual secure desktop session is not listed in the file system of the default session. By encapsulating all hard drive access within the virtual secure desktop session, the present invention prevents data leakage onto the untrusted computer.

In one embodiment, a user using the virtual secure desktop session does not have access to any personal files stored in the file system of the untrusted computer. The virtual secure desktop session only shows the files that the user saves to the secure vault during his virtual secure desktop session. However, all hardware devices, such as floppy drives and CD-ROMs, are available to the user during the virtual secure desktop session, and any files on a floppy or CD are accessible in the virtual secure desktop session.

In one embodiment, files in the untrusted computer's file system are shown in the virtual secure desktop session; however any changes to the file system that the user makes during the virtual secure desktop session, such as creating, updating or deleting a file, are not reflected in the file system of the default session. Likewise, any changes the user makes to the file system during the default session are not reflected in the file system of the virtual secure desktop session.

The secure working environment provided by the inventive virtual secure desktop uses a secure method of writing data to the untrusted computer's hard drive to prevent data leakage. Instead of writing data directly to the untrusted computer's hard drive, all processes and applications running in the inventive virtual secure desktop store data in a "secure vault." In addition, the settings of each desktop are kept separately, and more specifically, the settings of the virtual secure desktop are kept in the secure vault. The use of a secure vault is completely transparent to the user. All processing appears the same to the user.

3.0 Creating a Secure Vault

Figure 3:
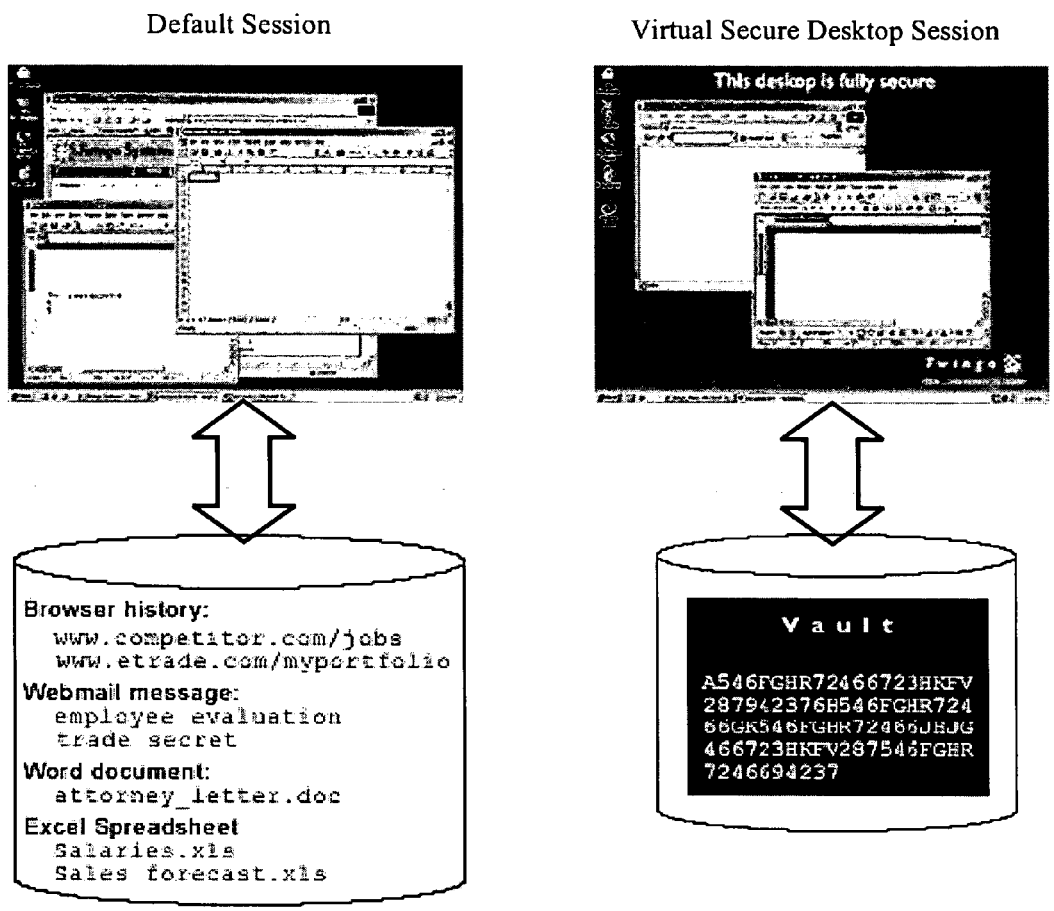
FIG. 3 is a diagram that illustrates how all data in the virtual secure desktop is encrypted into a secure vault while data in the default session is written clear onto the untrusted computer's hard drive.

The virtual secure desktop session creates on-the-fly a cryptographic file system for the secure vault. This allows for files to be created in the virtual secure desktop's encrypted file system for use by the user during the virtual secure desktop session. Nothing is ever written in clear to the disk during the virtual secure desktop session; it is all encrypted and written to the secure vault. FIG. 3 illustrates how data written to the hard drive during a default session and during a virtual secure desktop session differs. As shown, all hard drive access during the virtual secure desktop session is completely encrypted, while many data leakages may occur during the default session.

As shown in FIG. 2, the virtual secure desktop session 217 performs all hard drive access procedures through secure vault 218, while the default session 340 continues normal operation, accessing the hard drive 207 in a normal way.

The secure vault refers to a secure location, preferably encrypted disk space contained within a unique file. The virtual secure desktop encrypts and decrypts data on the fly as it is written to or read from the virtual secure desktop's secure vault. No user data is written in a non-protected way to the hard drive in the virtual secure desktop session. Therefore, reading data that was written from the virtual secure desktop requires proper authentication and access to the secure vault.

Although FIGS. 1B and 2 show secure vault 218 as being located within the local hard drive 207 of the untrusted computer, it is not required that the secure vault be on the untrusted computer's local hard drive. The secure vault could alternatively be located on a removable storage drive, for example. In one embodiment, the secure vault may be stored in a USB keychain removable device. By using a removable device, security is additionally increased.

Inside the secure vault, data is encrypted and decrypted on the fly as it is written or read from the virtual secure desktop. Encryption for the virtual secure desktop's secure vault can be performed using any method known to one skilled in the art. For example, strong encryption algorithms and technology such as the triple-DES algorithm may be used. Triple-DES is a variation of the ANSI standard Data Encryption Standard (DES). Using Triple DES, data is encrypted with a first key, decrypted with a second key and encrypted again with a third key, thereby providing excellent security.

Secure vault access may be achieved by installing a driver that will intercept all read and write access to the hard disk of the untrusted computer. Before writing to or reading from the hard drive in the virtual secure desktop session (but not in the default session), the piece of data is encrypted or decrypted. Many different methods of performing this type of on-the-fly encryption are known to those skilled in the art. The documents "Framework for Implementing File Systems in Windows NT" by Danilo Almeida from the Massachusetts Institute Of Technology dated May 1998 and "Creating User-Mode Device Drivers with a Proxy" by Galen C. Hunt from the Department of Computer Science of University of Rochester provide useful examples.

When the user ends the virtual secure desktop session, the secure vault is erased in a secure fashion, such as byte-to-byte. If the user turns off the computer, or there is a power interruption during a virtual secure desktop session, any information that was in the secure vault will remain encrypted as the key used during the session—which was stored only in volatile memory—will have been lost. Optionally, a timeout period may be set up such that the virtual secure desktop will end, and the secure vault will be removed, upon the user remaining idle for the timeout period.

4.0 Creating the Virtual Secure Desktop Session

When the downloaded plug-in application creates the virtual secure desktop session it first creates a secure vault for use by the virtual secure desktop session, then creates the separate secure desktop session linked to the secure vault. The present invention contemplates two approaches for creating a virtual secure desktop session. The first approach uses the multi-session feature of the Windows XP operating system. In this approach, the virtual secure desktop is linked to a session created by the downloaded plug-in application for a fake user. This second session runs side-by-side with the default session. All settings of the second session are set to force data to be written as encrypted data to the secure vault.

A second approach operates in a similar manner, but does not require an actual user session to be created. In the second approach the operating system API is intercepted in the user mode space of the processes owned by the user. Such interception allows the creation of a fake user session that will act as the virtual secure desktop session and does not require any specific privilege.

While these approaches will be described in more detail with respect to the Microsoft operating systems, neither approach is operating system specific, and could be implemented for any commercial or open source operating system such as Linux, MacOS or other operating systems known to one skilled in the art.

4.1 A Multi-Session Environment Approach for Creating a Virtual Secure Desktop

The Fast User Switching feature of the Windows XP Operating System is utilized in a first approach to creating the virtual secure desktop session. While this embodiment is described using Microsoft's Windows XP Operating System, those skilled in the art will understand that this embodiment is not limited to Windows XP, and similar features of other operating systems could be used to implement this embodiment.

In this embodiment, a driver that encrypts and decrypts information written to the hard drive is downloaded with the plug-in application. When the downloaded application is executed, this driver is installed. The driver performs read/write interception and redirects to the secure vault if the data comes from a fake user session that is used as the virtual secure desktop, as described in more detail herein.

In Windows XP, each user of a computer gets a separate Windows account. These accounts are really NT Profiles, which means that each user's data is separated. In Windows XP, it is not necessary for a user to log off the computer to switch users. Instead, the user's account is always logged on and the user can switch quickly between all open accounts. Multiple users can share a single computer, wherein each user's preferences and settings can be separately saved and applied. User-created data is stored in separate locations by default, typically to a different foldering tree in the file system. With Fast User Switching, it is possible to leave programs running and have another user log on to the machine. It is also possible to leave connections to the Internet active when switching from one user to another.

In this first approach to creating a virtual secure desktop, this feature of Windows XP is utilized by creating a fake user account for the virtual secure desktop. The downloaded plug-in application creates a virtual secure desktop session by causing a session for a fake user to be automatically created and linked to the secure vault.

Figure 4:
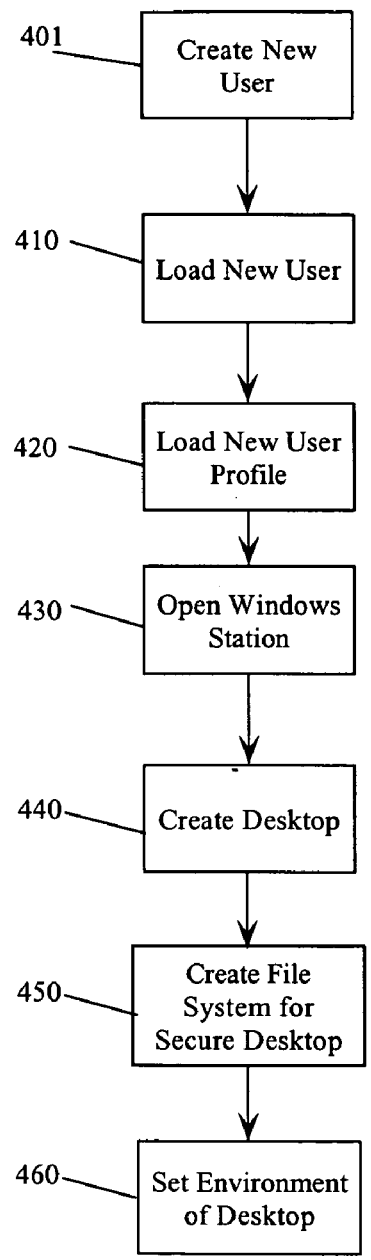
FIG. 4 is a flow diagram of a first approach for creating a virtual secure desktop session.

The steps of FIG. 4 illustrate a process that may be used to create the virtual secure desktop in Windows XP using this first approach. In step 401, a new user is created. This fake user will be used to create the virtual secure desktop session. To implement step 401*a* call to the standard NetUserAdd function of Windows SDK may be called, for example. The NetUserAdd function adds a user account and assigns a password and privilege level to the user.

Next, the user created in step 401 is loaded in step 410. This may be accomplished through a call to the LogonUser function of the Windows SDK. The LogonUser function logs the fake user onto the local computer. The user and password created in step 401 is passed to this function. The function returns a handle to a token that represents the logged-on (fake) user. This token handle can then be used to impersonate the specified (fake) user and to create processes running in the context of the specified (fake) user.

At step 420, the new user profile is loaded by calling API function LoadUserProfile. At step 430, a handle to an existing window station is retrieved by calling function OpenWindowStation.

At step 440, a new desktop is created for the fake user. This desktop will be the virtual secure desktop. The desktop may be created by calling function CreateDesktop which creates a new desktop on the window station. The desktop is a secure object within a window station object.

At step 450, a call to CreateProcessAsUser is made to run Windows Explorer in the newly created desktop. CreateProcessAsUser creates a new process (Windows Explorer) and its primary thread. The process runs in the security context of the fake user.

At step 460 the environment variables of the desktop are set. The secure vault is associated with the new virtual secure desktop at this step by setting the default location of the cache browser or the user documents. The user settings or templates may also be imported during this step.

4.2 Intercepting the Operating System API to Create a Virtual Secure Desktop

The first approach to creating a virtual secure desktop typically requires administrator privileges in order to create the fake user, the desktop for the fake user, and to install the encryption driver. There could be circumstances where the user does not have enough privileges to be able to use the first approach. This is especially true for public computers. Therefore a second approach that does not require special privileges was developed. A virtual secure desktop session can be created for any user, even a user operating under a "guest" login, using this approach.

In this approach, instead of creating an actual second user, the native API (Application Program Interface) of the operating system is intercepted. As is known to those skilled in the art, an API is a specific method prescribed by a computer operating system or by an application program by which a programmer writing an application program can make requests of the operating system or another application. The Native API serves as a means for calling operating system services located in kernel mode. As those skilled in the art appreciate, whenever a program executing in user mode (sometimes called "open" mode) needs to perform protected functions, such as input/output functions, allocating virtual memory, or starting a thread or process, it must call upon one or more services that live in kernel mode (sometimes called "protected" mode). In particular, in order to read data from or write data to the local hard drive, kernel mode functions are needed.

In Windows XP, these and other functions of the Native API are provided to user-mode programs by the NTDLL.DLL library. All Windows processes call a function of the NTDLL.DLL library to communicate with the kernel functions and to interact with hardware devices.

FIG. 5B is a block diagram that illustrates how processes operating in user mode use NTDLL.DLL, which contains Native API user-mode entry points, to access the native API of the operating system when writing data to the hard drive. As shown, the Windows API in DLLs used by applications make calls to functions NtCreateFile, NtReadFile, etc. in NTDLL.DLL. These functions call the kernel mode functions that will execute the requested actions.

In the Windows XP environment, NTDLL.DLL is the lowest part of user mode space. The basic idea in this approach to creating a secure desktop session is to intercept functions at this lowest level of user mode space, as any interception at a lower level would require administrator privileges. Intercepting the Operating System at the NTDLL.DLL level does not require any special privileges, so this approach can be used even for a user operating under a "guest" login.

By intercepting the Native API calls, it is possible to take control of the default session such that it appears to the default session that another session has been created. Like the first approach, all hard drive access for the secure desktop session is redirected to the secure vault through the intercepted NTDLL.DLL calls.

FIG. 5C illustrates one embodiment for intercepting the Native API calls. In this embodiment, the NTDLL.DLL calls are in effect replaced with the NTDLLbis.DLL calls. In other words, in each process, the addresses of the calls to the NTDLL.DLL functions are replaced with NTDLLbis.DLL functions. In essence, there is a virtual replacement of NTDLL.DLL functions with NTDLLbis.DLL functions in memory for each process.

FIG. 5A is a flowchart illustrating the processing performed by the NTDLLbis.DLL functions. If the call to the Native API is from a process linked with the virtual secure desktop session, the calls to the kernel functions are modified such that the data is encrypted or decrypted, and redirected to the secure vault location. In particular, the replaced functions first check to see if the process making a call to a NTDLL.DLL function is a process linked to the Secure Desktop Session, as shown by step 520. If the process is linked to the Secure Desktop Session, the call to the NTDLL.DLL function is controlled such that any hard drive access is encrypted/decrypted and redirected, as shown by step 530.

If the call is from a process linked with the default session that is attempting to access a file or data written in the secure vault, the request is automatically returned as denied, as shown by steps 540 and 550. If the request is from a process operating normally in the default session, no change is made and the call is made to the kernel library unchanged, as shown by step 560. As long as the request is not attempting to access a file that is in the secure vault, step 560 will be executed, and the request will be processed normally.

If the call to the kernel library is from a process in the secure desktop, the NTDLLbis function will make the call to the kernel mode function such that hard drive access will be redirected to the secure vault. If the call to the kernel library is a process in the default session, the NTDLLbis function does not alter the call, and merely passes the call through.

For example, if Application 1 in the default session makes a call to create a file on the hard drive, it will typically call "CreateFile" in the Windows API. Likewise Application 3 running in the secure desktop session will also make a call to "CreateFile" in the Windows API. CreateFile calls NtCreateFile in NTDLL.DLL. If it is determined that the request is from a process linked with the default session, the request is controlled as shown by step 540 in FIG. 5A. In this example, Application 1 in the default session making the call to NtCreateFile is intercepted by NtCreateFilebis. NtCreateFilebis determines that the process is not a secure desktop process, and passes the call to NtCreateFile unchanged. However, when Application 3 in the secure desktop session makes the call to NtCreateFile, NtCreateFilebis determines that the calling process is a secure desktop session process, and modifies the call to NtCreateFile such that encryption is performed, and the file is redirected to the secure vault. NtCreateFile communicates with the kernel library with the modified parameters such that the file is redirected to the secure vault.

In one embodiment the present invention creates a separate file directory for files created or modified in the virtual secure desktop and merges the content of this separate file directory with the original file directory so that the user cannot tell that files are being written to a separate secure vault.

FIG. 7C provides additional information about one embodiment for merging the separate file directories for the original content and the "target" content for the virtual secure desktop. In the example shown in FIG. 7C, original file directory structure 780 contains three main folders: A, B and H. Folder B contains subfolders C and D, and subfolder D contains three files, E, F and G. All of these folders and files are shown to the user in the virtual secure desktop upon starting the virtual secure desktop session. During the course of the virtual secure desktop session, the user deletes folder C and file G, modifies file E and creates new file I in subfolder D. These changes are not made directly to the original file directory structure 780. Instead, a separate "target content" file directory 785 is created within the secure vault by intercepting the write-to-file calls from the virtual secure desktop as shown by the interception process 770 in FIG. 7B.

For example, when the user creates File I in folder D in the virtual secure desktop session, the call to create the file is intercepted, as shown by interception process 770 in FIG. 7B, and a portion of the original file directory structure shown in structure 780 is copied to target content structure 785. As the user is attempting to create a file in folder D, only the portion of the file directory structure needed to create a file in folder D is created in the Target Content directory structure. In this case, Folder D is a subfolder of Folder B, so both are created in Target Content directory structure 785.

Target content structure 785 resides in the secure vault. File I is created in the target content structure in the secure vault, not in the original file structure. Likewise, subfolder J created during the virtual secure desktop session is created in target content file directory 785, not original structure 780. Similarly, when the user modifies file E, the copied File E in target content structure 785 is modified, not File E in original structure 780.

When the user deletes file G and folder C in the virtual secure desktop, the NtDeleteFile call is intercepted. File G and Folder C are not actually deleted, rather information regarding the deletion of file G and folder C is stored, as illustrated in FIG. 7D.

When the directory is displayed to the user in the virtual secure desktop session, the target content is merged with the original content to display merged content. As shown by merged file directory 790, File C and subfolder G are shown as having been deleted, even though they have not actually been deleted. File E is shown as having been modified. Newly created File I is displayed in subfolder D and newly created subfolder J is displayed. If the user displays the same file directory in the default session, the original content is displayed without any of the changes that were made during the virtual secure desktop session, as none of those changes were actually made to the original content.

As illustrated by process 790 in FIG. 7A, a normal Native API call to NtQueryDirectoryFile is made in the default session. The call to NtQueryDirectoryFile is intercepted in the virtual secure desktop session such that a NtQueryDirectoryFile call is made on the original content, a separate NtQueryDirectoryFile call is made on the target content, and these results are merged along with external shared information (files and folders that have been deleted in the secure desktop session) to create the merged file directory content displayed to the user in the virtual secure desktop session. This is illustrated by process 795 in FIG. 7A.

In addition to redirecting read/write access to files to the secure vault, any registry updates associated with a process linked with the virtual secure desktop session are redirected to a virtual registry stored in the secure vault. The redirections of the registry are handled exactly the same way as file I/O. By maintaining a separate registry for the virtual secure desktop, any changes to the settings that a user makes in the secure desktop, such as moving the toolbar, are saved only for the virtual secure desktop.

FIG. 8 illustrates the process of intercepting the Native API in more detail. This process monitors process creation on the computer and determines whether a process should be considered as associated with the default session or the secure desktop session.

As shown, in normal API call process 800, the Native API function "NtCreateProcess" is used to create process space in Windows. The created process loads DLLs, including NTDLL.DLL.

As shown in hooked API calls process 850, NtCreateProcess is called. However, in process 850 the process creation is intercepted. The new process is put in "suspended mode". After the process space is created, some code is injected in the process space to insure that all calls to NTDLL will be replaced by calls to NTDLLbis. The process is then resumed.

As is known to those skilled in the art, the LoadLibary function maps a specified executable module into the address space of the calling process, in this case the process just created by NtCreateProcess. By intercepting LoadLibrary, it is possible to control all DLLs loaded into the process and deny any suspicious DLL calls.

When the virtual secure desktop session ends, the secure vault is securely erased from the hard drive. As any changes made by any application in the virtual secure desktop session were made to the target content directory structure stored in the secure vault, and no changes were actually made to the original content of the untrusted computer, no information is left on the untrusted computer.

5.0 Implementation Mechanisms—Hardware Overview

FIG. 6 is a block diagram that illustrates a computer system 600 upon which an embodiment may be implemented.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to a network 622. An external terminal 612 or other computer system connects to the computer system 600 and provides commands to it using the imputer device 614. Network 622 may be coupled to one or more servers 630.

Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Computer system 600 can send messages and receive data, including program code, through the network(s), network link 620 and communication interface 618. In the Internet example, a server 630 might transmit a requested code for an application program through local network 622 and communication interface 618. In accordance with the invention, one such downloaded application provides for creating a virtual secure desktop as described herein.

Processor 604 may execute the received code as it is received, and/or stored in storage device 610, or other non-volatile storage for later execution.

6.0 Extensions and Alternatives

The above-described interception of the Native API can be used to redirect and modify any action done by the user. One extension of the invention is to create an "undoable PC".

In most applications, an "undo" feature enables a user to undo an action. The Native API interception of the present invention can be used to undo at the PC level. An "undoable PC" means that a user can restore a PC to a previous state. One example of the usefulness of an undoable PC is that it can be used to restore a PC to its state before being infected by a virus.

The basic idea of the undoable PC is illustrated is illustrated in FIG. 9. As shown, a time t, a specific state of the PC is saved. At time t' the PC is restored to the state as of time t. Any actions done by the user between time t and t' are undone.

As shown in FIG. 9, PC state at time t is defined by two elements: the state of the hard drive and the state of the RAM of the PC. At time t-$\epsilon$ a snapshot of RAM is taken. At time t, an incremental disk that can be for instance the encrypted vault described earlier is created using the methods previously described herein. Between time t and time t' all write disk accesses are redirected to the incremental disk. At time t' the incremental disk is discarded and destroyed, and the content of RAM is restored. That is, at time t', the PC is restored to its state at time t.

Both virtual and physical memory should be restored. This can be achieved by copying the virtual and physical memory to a safe location, preferably the incremental disk, at time t-$\epsilon$ and restoring it at time t'. For most operating systems, virtual memory is accessed from a file. In these types of systems, the virtual memory file should be copied. Physical memory can be dumped through kernel calls of the operating system. Memory is restored at by copying the virtual memory form the saved file and loading the saved physical memory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing security for a current user of an untrusted computer accessing a networked server through a secure communications session, the method comprising:

creating, for the current user, a default session on the untrusted computer having a default file system;

creating, for the current user, a separate user session on the same untrusted computer by adding a new user account and password using an operating system of the untrusted computer;

wherein said separate user session for the current user runs simultaneously side-by-side with said default session that the current user is using;

creating a separate file system for the separate user session; and in response to determining that an attempt to access the default file system is by a process linked with the separate user session of the current user, causing the attempt to access the default file system to be encrypted and redirected to the separate file system of the separate user session of the current user;

allowing a process linked with the default session to access the default file system without modification.

2. The method of claim 1, wherein the step of causing all attempts to access the default file system by a process linked to the separate user session to be encrypted and redirected comprises setting environment settings for the separate user session.

3. The method of claim 1, wherein the separate file system is located on the hard disk drive of the untrusted computer.

4. The method of claim 1, wherein the separate file system is located on a removable device being used in the untrusted computer.

5. The method of claim 1, wherein settings are imported to customize the separate user session.

6. The method of claim 5, wherein imported settings are either specific to the current user or are a general template of settings.

7. The method of claim 1, wherein the separate user session includes a desktop icon that identifies the separate user session as a secure desktop session.

8. The method of claim 1, wherein a user can switch between the default session and the separate user session using desktop icons in the default session and in the separate user session.

9. The method of claim 1, wherein processes linked with the separate user session automatically store data in the separate file system and processes linked with the default session store data in the default file system.

10. The method of claim 1, wherein at the end of the separate user session, the separate file system is erased in a secure fashion.

11. In a computer where the operating system includes a protected mode and an open mode, a method of intercepting calls for a function of the protected mode from a secure desktop session for encryption and redirection, wherein the method is implemented in the open mode of the operating system only, said method comprising the computer-implemented steps of:

intercepting all requests for functions that access the computer's default file system from all processes, including processes linked with a default session of a particular user of the computer and processes linked with the secure desktop session of the particular user of the same computer, determining whether a request to access the default file system is from a process linked with the secure desktop session of the particular user; and in response to determining that the request to access the default file system is from a process linked with the secure desktop session of the particular user, encrypting and redirecting the request to send the request to a predetermined separate location associated with the secure desktop session, and all data written to the predetermined separate location; and in response to determining that the request to access the default file system is from a process linked with the default session of the particular user, denying the request if the request is attempting to access a file in the predetermined separate location associated with the secure desktop session, otherwise passing the request to the protected mode function unmodified.

12. The method of claim 11, wherein the predetermined separate location is a file on the computer's hard disk drive.

13. The method of claim 11, wherein the predetermined separate location is on a removable storage device being used with the computer.

14. The method of claim 11, wherein the secure desktop session includes a desktop icon that identifies the secure desktop session as a secure desktop session.

15. The method of claim 11, wherein at the end of the secure desktop session, the data stored in the predetermined separate location is erased in a secure fashion.

16. The method of claim 11, wherein the operating system is Microsoft Windows XP, and the step of intercepting all requests for functions includes intercepting calls to functions in NTDLL.DLL.

17. The method of claim 11, wherein the predetermined separate location includes a copy of a portion of the computer's file directory.

18. The method of claim 17, wherein if the request from a process linked with the secure desktop session is a request to create a new file in the computer's file system, then the new file is created in the copy of the portion of the file directory in the predetermined separate location.

19. The method of claim 18, wherein all requests from a process linked with the secure desktop session for the portion of the file directory copied to the predetermined separate location receive a view of the portion of the file directory merged with the copy of the portion of the file directory in the predetermined separate location, including the new file created in the copy of the portion of the file directory.

20. The method of claim 17, wherein if the request from a process linked with the secure desktop session is a request to delete a file existing in the computer's file system, then information about the deletion of the existing file is stored.

21. The method of claim 20, wherein all requests from a process linked with the secure desktop session for the portion of the file directory copied to the predetermined separate location receive a view of the portion of the file directory merged with information about the deletion of the existing file in which the existing file appears to have been deleted.

22. A non-transitory computer-readable volatile or non-volatile storage medium carrying one or more sequences of instructions for providing security for a current user of an untrusted computer accessing a networked server through a secure communications session, which instructions, when executed by one or more processors, cause the one or more processors to carry out the steps of:
creating, for the current user, a default session on the untrusted computer having a default file system;
creating, for the current user, a separate user session on the same untrusted computer;
wherein said separate user session for the current user runs simultaneously side-by-side with said default session that the current user is using;
creating a separate file system for the separate user session; and
in response to determining that an attempt to access the default file system is by a process linked with the separate user session of the current user, causing the attempt to access the default file system to be encrypted and redirected to the separate file system of the separate user session of the current user;
allowing a process linked with the default session to access the default file system without modification.

23. A computer-readable volatile or non-volatile storage medium as recited in claim 22, wherein the separate file system is located on a removable device being used in the untrusted computer.

24. A computer-readable volatile or non-volatile storage medium as recited in claim 22, wherein processes linked with the separate user session automatically store data in the separate file system and processes linked with the default session store data in the default file system.

25. A computer-readable volatile or non-volatile storage medium as recited in claim 22, wherein at the end of the separate user session, the separate file system is erased in a secure fashion.

26. A non-transitory computer-readable volatile or non-volatile storage medium carrying one or more sequences of instructions, which instructions, when executed by one or more processors, cause the one or more processors to carry out the steps of:
intercepting all requests for functions that access a computer's default file system from all processes, including processes linked with a default session of a particular user of the computer and processes linked with a secure desktop session of the particular user of the same computer,
determining whether a request to access the default file system is from a process linked with the secure desktop session of the particular user; and
in response to determining that the request to access the default file system is from a process linked with the secure desktop session of the particular user, encrypting and redirecting the request to send the request to a predetermined separate location associated with the secure desktop session, and encrypting all data written to the predetermined separate location; and
in response to determining that the request to access the default file system is not from a process linked with the secure desktop session of the particular user, denying the request if the request is attempting to access a file in the predetermined separate location associated with the secure desktop session, otherwise passing the request to a protected mode function unmodified.

27. A computer-readable volatile or non-volatile storage medium as recited in claim 26, wherein the predetermined separate location includes a copy of a portion of the computer's file directory.

28. A computer-readable volatile or non-volatile storage medium as recited in claim 27, wherein if the request from a process linked with the secure desktop session is a request to create a new file in the computer's file system, then the new file is created in the copy of the portion of the file directory in the predetermined separate location.

29. A computer-readable volatile or non-volatile storage medium as recited in claim 26, wherein the operating system is Microsoft Windows XP, and the step of intercepting all requests for functions includes intercepting calls to functions in NTDLL.DLL.

* * * * *